(12) United States Patent
Lee

(10) Patent No.: US 7,144,108 B2
(45) Date of Patent: Dec. 5, 2006

(54) SPECTACLES AND SUNSHADE CLIP ASSEMBLY USING MAGNETS

(76) Inventor: Heung-Woo Lee, #101-210, Seohan Apartment, 1521 Sangin-Dong Dalseo-Gu, Daegu (KR)

( * ) Notice: Subject to any disclaimer, the term of this patent is extended or adjusted under 35 U.S.C. 154(b) by 0 days.

(21) Appl. No.: 11/116,207

(22) Filed: Apr. 28, 2005

(65) Prior Publication Data

US 2006/0244898 A1   Nov. 2, 2006

(51) Int. Cl.
*G02C 9/00* (2006.01)
(52) U.S. Cl. .......................................... 351/47; 351/57
(58) Field of Classification Search .................. 351/47, 351/48, 57, 58, 44, 41, 158
See application file for complete search history.

(56) References Cited

U.S. PATENT DOCUMENTS 6,729,722 B1 * 5/2004 Park ............................. 351/47

\* cited by examiner

*Primary Examiner*—Hung Xuan Dang
(74) *Attorney, Agent, or Firm*—Mayer, Brown, Rowe and Maw LLP

(57) ABSTRACT

Disclosed herein is a spectacles and sunshade clip assembly. The spectacles include a pair of lens frames each having a prescription lens fitted therein, a nose bridge interposed between the lens frames to connect the lens frames to each other, and a pair of temple arms connected to opposite outer ends of both the lens frames by means of hinges in a foldable manner. The sunshade clip, to be detachably attached to a front side of the spectacles, includes a pair of elongated coupling plates integrally formed along upper ends of both the lens frames thereof, the coupling plates protruding toward both the lens frames of the spectacles to come into contact with upper surfaces of the lens frames in an assembled state of the spectacles and the sunshade clip.

2 Claims, 6 Drawing Sheets

SPECTACLES AND SUNSHADE CLIP ASSEMBLY USING MAGNETS

BACKGROUND OF THE INVENTION

1. Field of the Invention

The present invention relates to a spectacles and sunshade clip assembly using magnets, and more particularly, to a spectacles and sunshade clip assembly which can permit a wearer to freely attach or detach sunglasses, having no temple arms (hereinafter, referred to as a sunshade clip), to or from a front side of spectacles.

2. Description of the Related Art

Spectacles are optical instrument consisting of a pair of prescription lenses for correcting defective vision of a wearer, and mainly have substantially no sunlight-intercepting function. Therefore, when the wearer's eyes are exposed to high intensity ultraviolet rays of sunlight in the summer, there exists a necessity to wear sunglasses with tinted lens to protect the eyes from the sunlight, instead of wearing the ordinary spectacles.

However, sunglasses are not generally designed for persons wearing prescription lenses, and thus, persons, who require prescription lenses, have to order special sunglasses with prescription lenses conforming to their defective eyesight. This imposes a heavy cost burden on the wearer, and incurs an inconvenience in use, normally, having to alternately wear the sunglasses and spectacles.

In order to solve the above described problems, it has recently been proposed to detachably attach a sunshade clip to a front side of the ordinary spectacles. The sunshade clip is comprised of two lens frames with no temple arms, each of the frames having a tinted lens fitted therein, thereby providing the same effect as sunglasses.

Heretofore various technical solutions have been continuously developed and utilized to secure the sunshade clip to the spectacles by means of magnets. A representative example of the conventional technical solutions is shown in FIG. 6, and will be now explained in detail.

As shown in FIG. 6, which is a partially cut-away exploded perspective view illustrating spectacles and a sunshade clip in accordance with the prior art, the spectacles 10 comprise a pair of lens frames 2 each having a prescription lens 1 fitted therein, a nose bridge 3 interposed between the lens frames 2 to connect the lens frames 2 to each other, and a pair of temple arms 4 connected to opposite outer ends of both the lens frames 2 by means of L-shaped hinges 5. A sunshade clip 20, to which the spectacles 10 are detachably attached, comprises a pair of lens frames 22 each having a tinted lens 21 fitted therein, and a nose bridge 23 interposed between the lens frames 22 to connect the lens frames 22 to each other.

To secure the sunshade clip 20 to the spectacles 10, the nose bridges 3 and 23 of both the spectacles 10 and the sunshade clip 20 include respective permanent magnets 27 and 28 embedded in recesses 25 and 26 defined therein. Thereby, the sunshade clip 20 is able to be detachably attached to the spectacles 10 by making use of a magnetic force generated by the permanent magnets 27 and 28.

For the strong and stable engagement of the permanent magnets 27 and 28, as will be naturally expected, the nose bridge 23 of the sunshade clip 20 has an engagement extension 29 protruding toward the nose bridge 3 of the spectacles 10 to come into contact at a lower surface thereof with an upper surface of the nose bridge 3 of the spectacles 10. The recess 26 of the sunshade clip 20, embedded with the permanent magnet 28, is defined in the extension 29 of the nose bridge 23.

In the conventional solution to secure the sunshade clip to the spectacles by means of the permanent magnets embedded in their nose bridges, however, the overall sizes of both the nose bridges are excessively large due to the recesses for receiving the permanent magnets, imposing a heavy burden on the wearer's nose, and making the sunshade clip uncomfortable to wear. Further, the above described conventional securing manner considerably restricts the design of the sunshade clip and spectacles.

Moreover, according to the fact that the permanent magnets are mounted in the spectacles and the sunshade clip, respectively, both the permanent magnets must be accurately oriented relative to each other in predetermined directions to achieve maximum magnetic attraction therebetween. Otherwise, the sunshade clip may fail to be attached to the spectacles, resulting in deterioration in attachment efficiency and productivity of both the spectacles and the sunshade clip.

In addition, in the above described prior art configuration wherein the coupling of the spectacles and the sunshade clip depends on their nose frames only, even if the permanent magnets have strong magnetic force, they are barely able to stably bear the weight of the spectacles and the sunshade clip, and easily unintentionally detached from each other when an external force is applied thereto due to movement at the wearer.

SUMMARY OF THE INVENTION

Therefore, the present invention has been made in view of the above problems, and it is an object of the present invention to provide a spectacles and sunshade clip assembly in which coupling means to attach a sunshade clip to spectacles are provided at both lens frames of the sunshade clip to maximize an attachment area between the sunshade clip and the spectacles without limiting the design of the spectacles and the sunshade clip, thereby substantially preventing the sunshade clip from being unintentionally detached from the spectacles, and improving not only quality and marketability of products but also convenience in use thereof.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
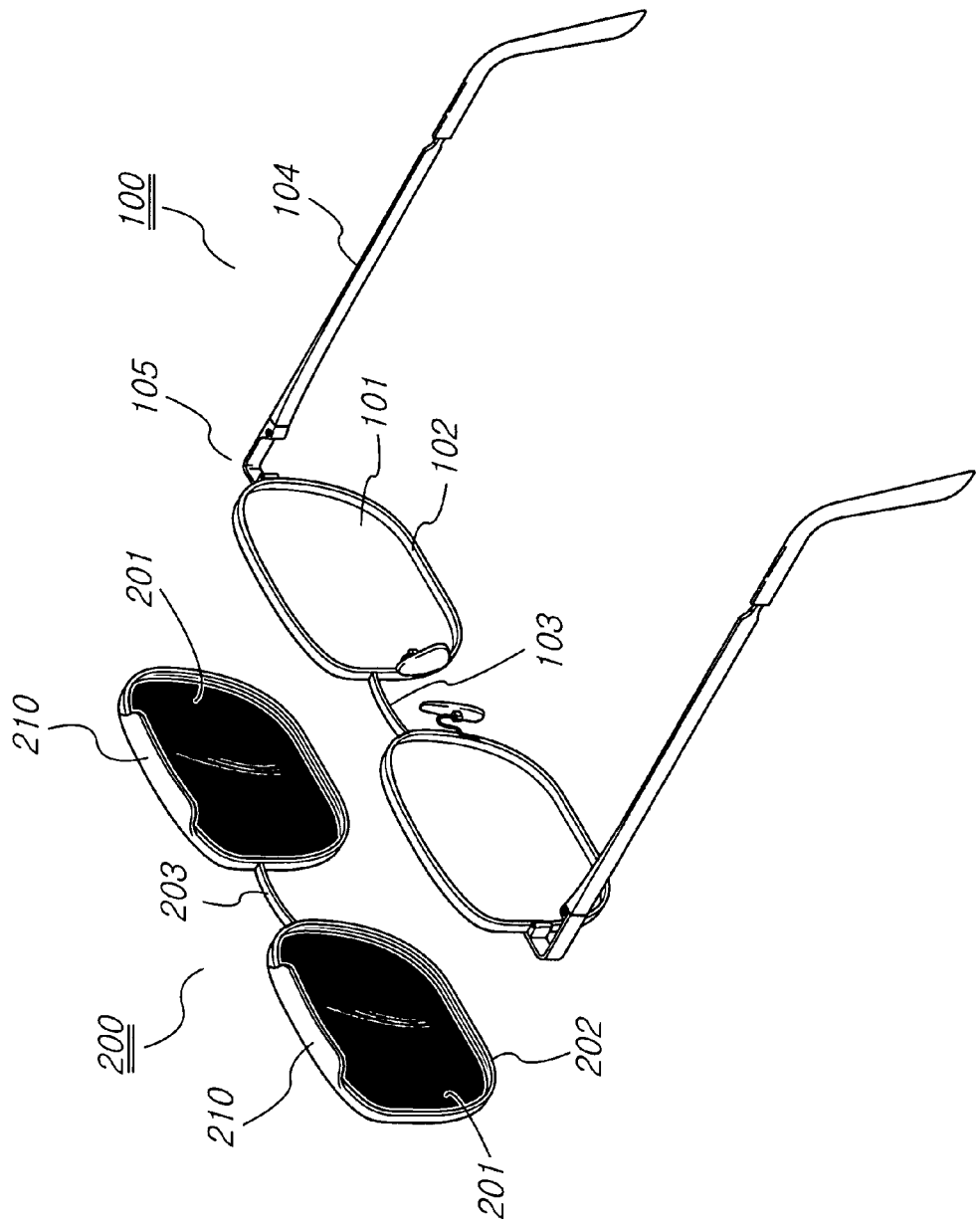
FIG. 1 is an exploded perspective view illustrating a spectacles and sunshade clip assembly using magnets in accordance with a preferred exemplary embodiment of the present invention.
Figure 2:
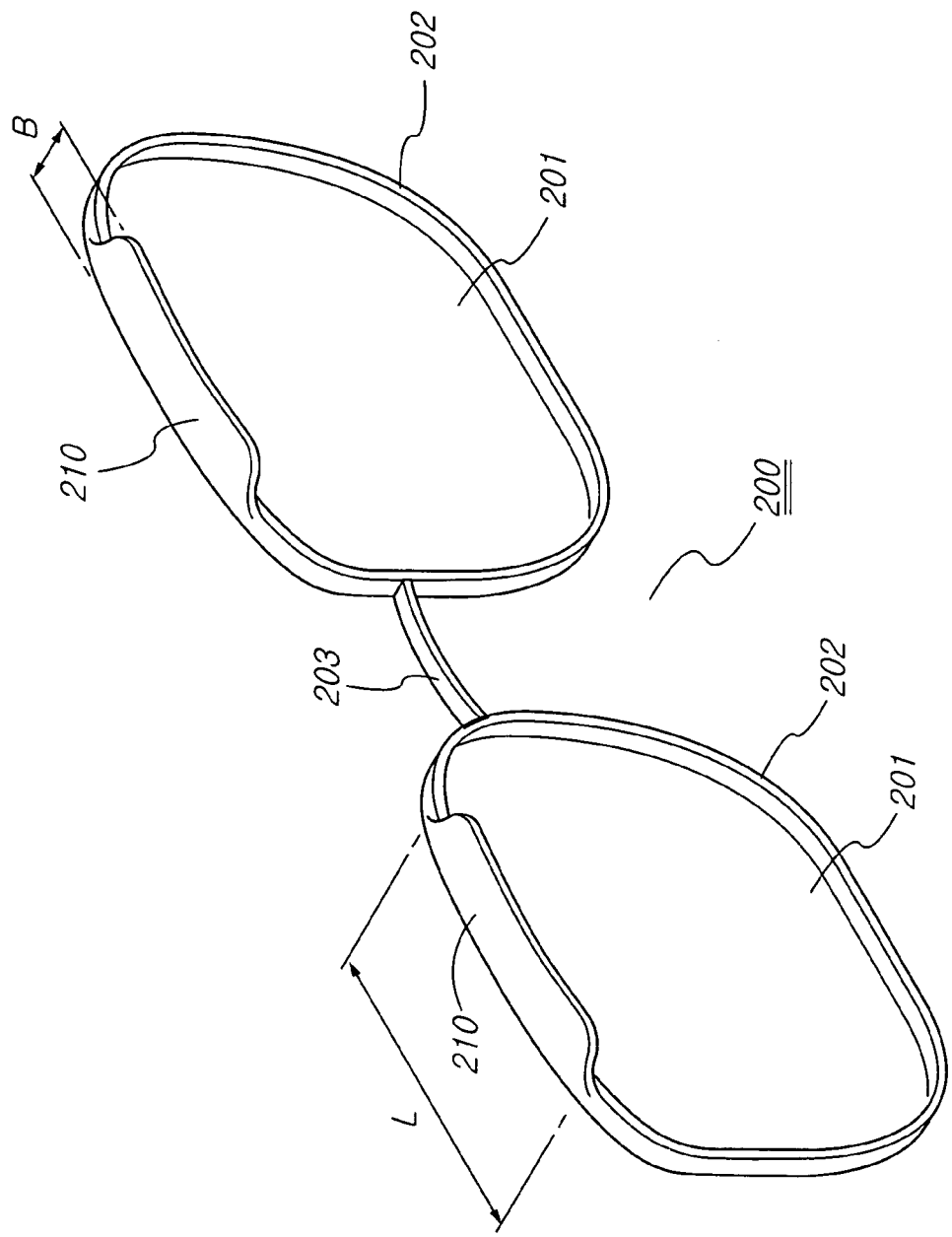
FIG. 2 is a perspective view of a sunshade clip of FIG. 1.
Figure 3:
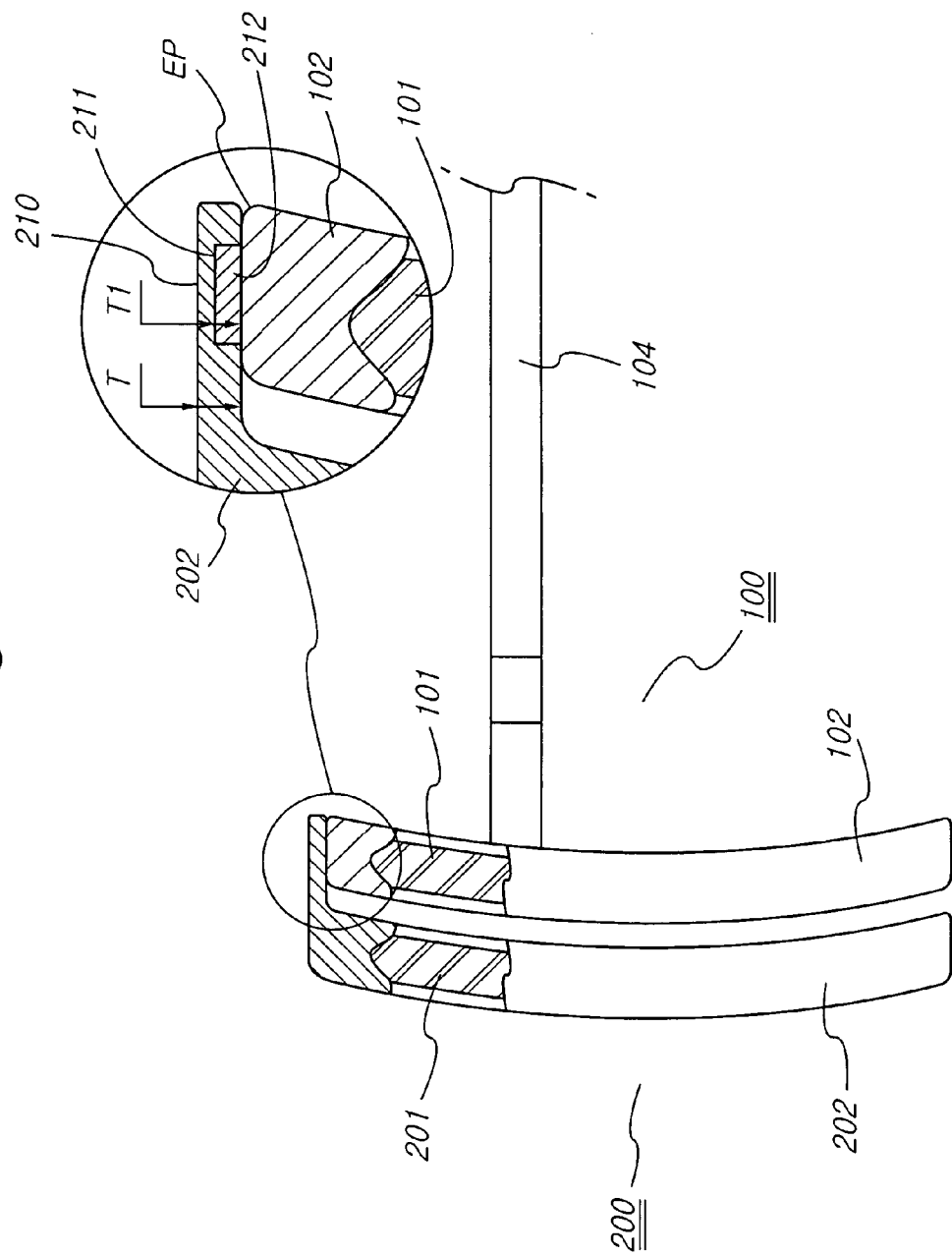
FIG. 3 is a side sectional view illustrating the coupled state of the spectacles and sunshade clip assembly of FIG. 1.
Figure 4:
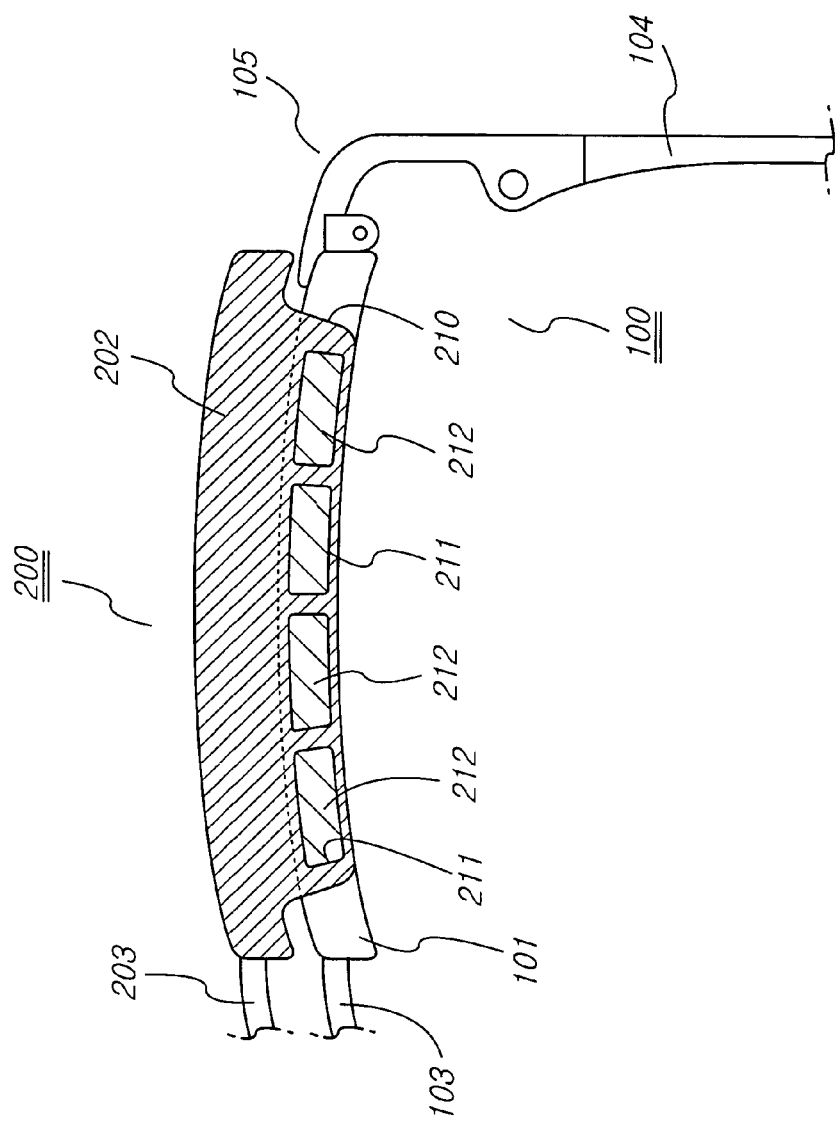
FIG. 4 is a plan sectional view illustrating the coupled state of the spectacles and sunshade clip assembly of FIG. 1.
Figure 5:
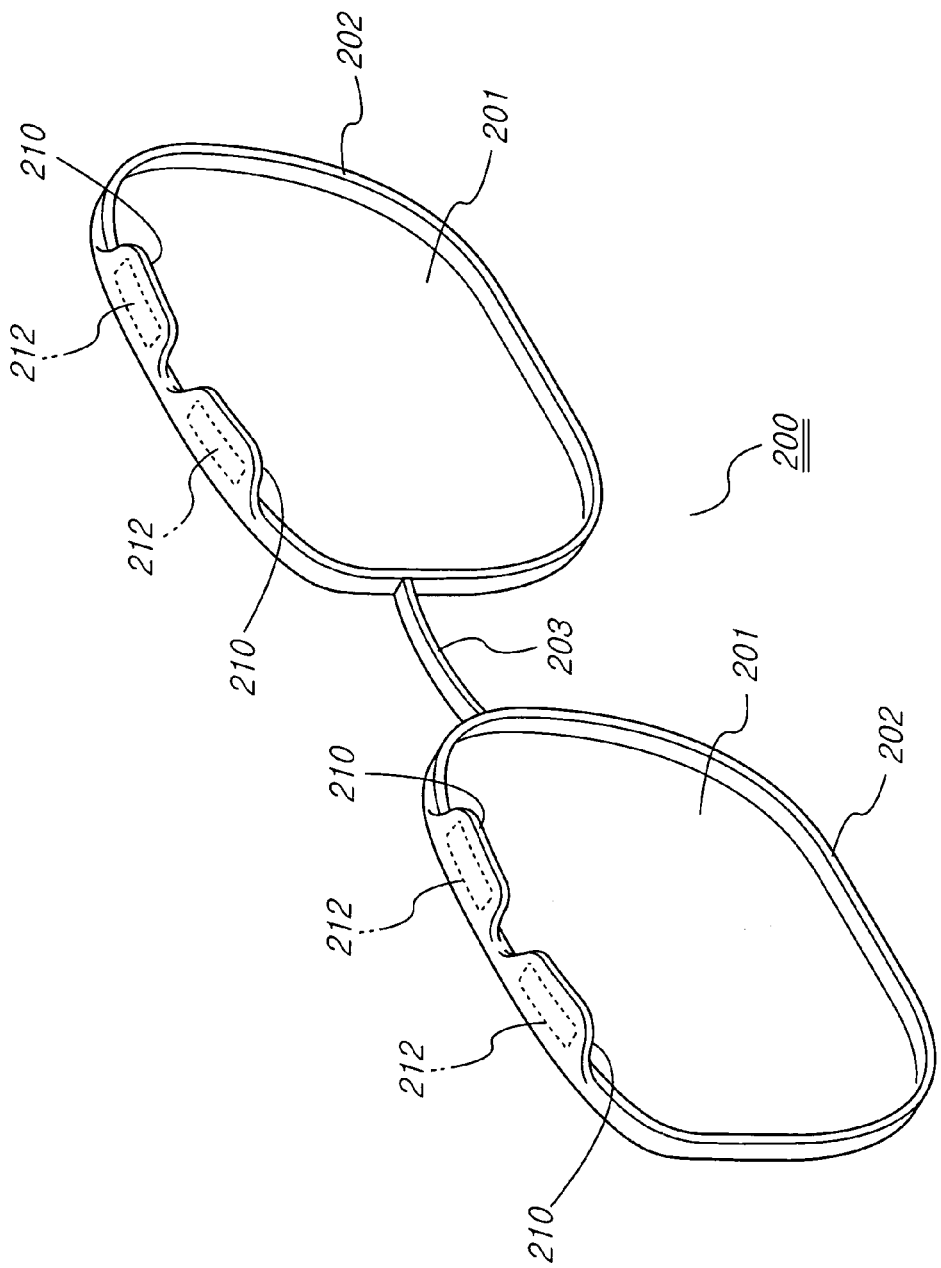
FIG. 5 is a perspective view of the alternative configuration of the sunshade clip.
Figure 6:
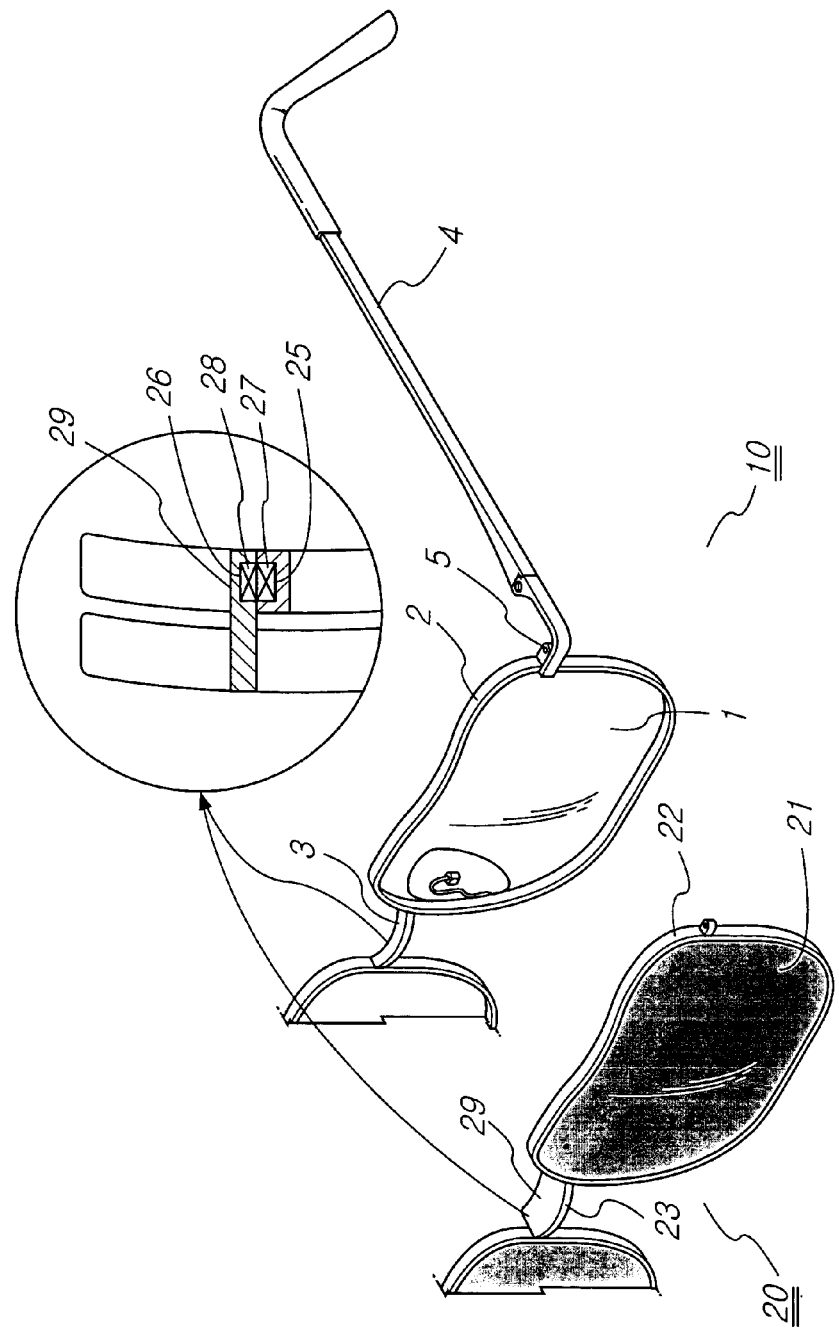
FIG. 6 is a partially cut-away exploded perspective view illustrating spectacles and a sunshade clip in accordance with the prior art.

FIG. 1 is an exploded perspective view illustrating a spectacles and sunshade clip assembly using magnets in accordance with a preferred exemplary embodiment of the present invention. FIG. 2 is a perspective view of a sunshade clip of FIG. 1. FIG. 3 is a side sectional view illustrating the coupled state of the spectacles and sunshade clip assembly of FIG. 1. FIG. 4 is a plan sectional view illustrating the coupled state of the spectacles and sunshade clip assembly of FIG. 1. FIG. 5 is a perspective view of the alternative configuration of the sunshade clip.

As shown in FIGS. 1 and 2, in the spectacles and sunshade clip assembly using magnets in accordance with a preferred exemplary embodiment of the present invention, spectacles 100 comprise a pair of lens frames 102 each having a prescription lens 101 fitted therein, a nose bridge 103 interposed between the lens frames 102 to connect the lens frames 102 to each other, and a pair of temple arms 104 connected to opposite outer ends of both the lens frames 102 by means of L-shaped hinges 105.

A sunshade clip 200, configured to be detachably attached to a front side of the spectacles 100, comprises a pair of lens frames 202 each having a tinted lens 201 fitted therein, and a nose bridge 203 interposed between the lens frames 202 to connect the lens frames 202 to each other.

Based upon the technical idea that the sunshade clip 200 is detachably attached to the spectacles 100 by means of magnets, the present invention suggests to increase the attachment ability between the spectacles 100 and the sunshade clip 200 without any restriction in design of both the spectacles 100 and the sunshade clip 200, thereby substantially eliminating the risk of unintentional detachment of the sunshade clip 200 from the spectacles 100.

For this, in the preferred exemplary embodiment of the present invention, the sunshade clip 200 further comprises a pair of elongated coupling plates 210 integrally formed along upper ends of both the lens frames 202, respectively. The coupling plates 210 protrude toward both the lens frames 102 of the spectacles 100 to come into contact with upper surfaces of the lens frames 102 in an assembled state of the spectacles 100 and the sunshade clip 200.

Each coupling plate 210 has a protruding width B determined so that a distal end of the coupling plate 210 is located to correspond to an inner or rear edge EP of the upper surface of the lens frame 102. This is effective to prevent a deterioration of appearance due to inconsistency between the assembled sunshade clip and spectacles. Further, the overall length L of the coupling plate 210 is determined so that the coupling plate 210 covers approximately 60% of the upper surface of the lens frame 102, in order to stably maintain the coupled state thereof.

The coupling plate 210 has a plurality of magnet recesses 211 defined in a lower surface thereof. The magnet recesses 211 have the same size as each other and are arranged at an equal interval for receiving a corresponding number of magnets 212. Alternatively, a single magnet recess having an elongated shape may be defined in the coupling plate 210 to receive a single elongated magnet.

In the embodiment of the present invention, the magnet 212 is permanently mounted in the magnet recess 211 by means of certain fastening means, such as adhesives. Of course, it will be clearly understood that the magnet and the magnet recess may have a difference in size for interference fit therebetween, without being limited thereto, and other various fixation manners may be employed.

In connection with the use of the plurality of magnets 212, preferably, the coupling plate 210 and the magnet 212 have minimized thicknesses T and T1 in order to minimize an increase in the overall height of the sunshade clip 200, thereby ensuring lightness when being worn by the wearer.

As will be naturally understood, the lens frames 102 of the spectacles 100, to which the magnets 212 embedded in the coupling plates 210 of the sunshade clip 200 are attached, are made of magnetically attractable materials. Meanwhile, referring to FIG. 5 illustrating the alternative configuration of the sunshade clip 200, each coupling plate 210 of the previous embodiment may be divided into two or three sections, instead of taking the form of an elongated single section.

In use, the spectacles 100 are normally used solely to correct defective vision of a wearer. If necessary, i.e. when it is desired to protect the wearer's eyes from high intensity ultraviolet rays of sunlight in the summer, the sunshade clip 200 is coupled to the front side of the spectacles 100 before or after the spectacles 100 are worn by the wearer.

After the spectacles 200 are coupled to the front side of the spectacles 100, the coupling plates 210, which are integrally formed at the top of the lens frames 201 of the sunshade clip 200 to protrude toward the spectacles 100, are located on the upper surfaces of the lens frames 102 of the spectacles 100.

Thereby, the coupling plates 210 come into close contact with the lens frames 102 by means of a magnetic force of the magnets 212, achieving a strong coupling between the spectacles 100 and the sunshade clip 200.

Since the coupling plates 210 of the sunshade clip 200 have the minimized thickness and are stably coupled to the lens frames 102 over a relatively wide area, it will be easily understood that the resultant spectacles and sunshade clip assembly has substantially no risk of unintentional separation between the spectacles and the sunshade clip even if an external force is applied thereto due to movement at the wearer.

Further, by virtue of the fact that the coupling plates 210 are integrally formed with the lens frames 202 of the sunshade clip 200, there is no restriction in the general design of the spectacles 100 and the sunshade clip 200, and the resultant spectacles and sunshade clip assembly is not confronted by a deterioration in the appearance thereof.

In addition to achieve such a wide coupling area with the spectacles 100, the pair of coupling plates 210 are provided at both the lens frames 102, respectively, to achieve a symmetrical balanced arrangement thereof. This allows the coupling plates 210 to be effectively maintained in a stable state and maximizes a convenience in use.

As apparent from the above description, the present invention provides a spectacles and sunshade clip assembly using magnets in which a pair of coupling plates are provided at both lens frames of a sunshade clip to maximize a coupling area between the sunshade clip and spectacles without restricting the design of both the spectacles and the sunshade clip. Further, according to the present invention, the pair of coupling plates is supported on both lens frames of the spectacles, respectively, to achieve a stable symmetrical arrangement thereof. This substantially prevents the sunshade clip from being unintentionally detached from the spectacles. Therefore, the resultant spectacles and sunshade clip assembly can achieve an improved convenience in use as well as high product quality.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A spectacles and sunshade clip assembly comprising spectacles and a sunshade clip to be coupled to a front side of the spectacles, the spectacles including a pair of lens frames each having a prescription lens fitted therein, a nose bridge interposed between the lens frames to connect the lens frames to each other, and a pair of temple arms connected to opposite outer ends of both the lens frames by means of hinges in a foldable manner, the sunshade clip including a pair of lens frames each having a tinted lens fitted therein, and a nose bridge interposed between the lens frames to connect the lens frames to each other, wherein the lens frames of the spectacles are made of magnetically attractable materials, wherein the sunshade clip further includes a pair of elongated coupling plates integrally formed along upper ends of both the lens frames thereof, the coupling plates protruding toward both the lens frames of the spectacles to come into contact with upper surfaces of the lens frames in an assembled state of the spectacles and the sunshade clip, wherein each coupling plate has a plurality of magnet recesses defined in a lower surface thereof to receive a corresponding number of magnets, thereby coupling the sunshade clip to the spectacles by means of a magnetic force of the magnets, wherein the coupling plate and the magnet have respective minimized thicknesses, and wherein each coupling plate has a predetermined protruding width such that a distal end of the each coupling plate is located to correspond to an inner or rear edge of the upper upper surface of the lens frame; and a length of the coupling plate is predetermined such that the coupling plate covers approximately 60% of the upper surface of the lens frame.

2. The assembly as set forth in claim 1, wherein the coupling plate is divided into two or three sections.

* * * * *